United States Patent
Chiang

(10) Patent No.: US 8,923,466 B2
(45) Date of Patent: Dec. 30, 2014

(54) MULTI-PHASE CLOCK SWITCHING DEVICE AND METHOD THEREOF

(75) Inventor: Ming-Cheng Chiang, Hsin Chu (TW)

(73) Assignee: Realtek Semiconductor Corp., Hsinchu (TW)

(*) Notice: Subject to any disclaimer, the term of this patent is extended or adjusted under 35 U.S.C. 154(b) by 475 days.

(21) Appl. No.: 13/194,260

(22) Filed: Jul. 29, 2011

(65) Prior Publication Data

US 2012/0027144 A1 Feb. 2, 2012

(30) Foreign Application Priority Data

Jul. 30, 2010 (TW) ................. 99125469 A

(51) Int. Cl.
*H03D 3/24* (2006.01)
*H04L 7/033* (2006.01)

(52) U.S. Cl.
CPC .................... *H04L 7/0337* (2013.01)
USPC .......................... 375/373; 375/354

(58) Field of Classification Search
USPC ................................. 375/373, 354
See application file for complete search history.

(56) References Cited

U.S. PATENT DOCUMENTS

| 5,291,528 | A * | 3/1994 | Vermeer ...................... 375/354 |
| 6,452,426 | B1 * | 9/2002 | Tamarapalli et al. ........... 327/99 |
| 7,023,944 | B2 * | 4/2006 | Gau ............................... 375/373 |
| 7,039,146 | B2 * | 5/2006 | Chiu ............................. 375/373 |
| 2008/0012605 | A1 | 1/2008 | Cheung |
| 2008/0265968 | A1 * | 10/2008 | Furuichi ...................... 327/299 |
| 2010/0306426 | A1 * | 12/2010 | Boonstra et al. ................ 710/57 |

FOREIGN PATENT DOCUMENTS

CN 101295971 A 10/2008

* cited by examiner

*Primary Examiner* — Michael Neff
*Assistant Examiner* — Nader Bolourchi
(74) *Attorney, Agent, or Firm* — Muncy, Geissler, Olds & Lowe, P.C.

(57) ABSTRACT

A multi-phase clock switching device includes a plurality of phase selection circuits. The phase selection circuit is used to receive a plurality of phase clock signals and determine how to output the phase clock signals to generate an output signal according to a switching signal. The phase selection circuit includes a selection unit and a protection unit. The selection unit receives at least a phase clock signal and determines how to output a phase clock signal according to the at least a phase clock signal and a selection signal. The protection unit determines how to generate the selection signal according to the phase clock signal and the switching signal.

18 Claims, 14 Drawing Sheets

FIG. 3B

|  | (a) | (b) | (c) | (d) | (e) | (f) | (g) | (h) |
|---|---|---|---|---|---|---|---|---|
| P7 | 1 | 0 | 0 | 0 | 0 | 0 | 0 | 1 |
| P6 | 0 | 0 | 0 | 0 | 0 | 0 | 1 | 0 |
| P5 | 0 | 0 | 0 | 0 | 0 | 1 | 1 | 0 |
| P4 | 0 | 0 | 0 | 0 | 1 | 1 | 0 | 0 |
| P3 | 0 | 0 | 0 | 1 | 1 | 0 | 0 | 0 |
| P2 | 0 | 0 | 1 | 0 | 0 | 0 | 0 | 0 |
| P1 | 0 | 1 | 1 | 0 | 0 | 0 | 0 | 0 |
| P0 | 1 | 1 | 0 | 0 | 0 | 0 | 0 | 0 |

Par2

| G[0] | 0 | 1 | 1 | 0 | 1 | 1 | 0 |
| G[1] | 0 | 0 | 1 | 1 | 1 | 0 | 0 |
| G[2] | 0 | 0 | 0 | 1 | 1 | 1 | 1 |

Par1

(1) a0
(2) a1
(3) a2
(4) a3
(5) a4
(6) a5
(7) a6
(8) a7

MULTI-PHASE CLOCK SWITCHING DEVICE AND METHOD THEREOF

This application claims the benefit of the filing date of Taiwan Application Ser. No. 099125469, filed on Jul. 30, 2010, the content of which is incorporated herein by reference.

BACKGROUND (a) Field of the Invention

The invention relates to a switching device, particularly to a multi-phase clock switching device.

(b) Description of the Related Art

FIG. 1A shows a schematic diagram illustrating a conventional phase lock loop 10 and a phase selection device 11. The phase lock loop 10 outputs a plurality of phase clock signals. The phase selection device 11 receives these phase clock signals and selects one of phase clock signals as an output signal O according to a switching signal S.

In general, a conventional phase selection device 11 includes a plurality of phase selection circuits 11*a* and a plurality of logic units 11*b*, as shown in FIG. 1B. The circuitry layout and configuration of the phase selection circuits 11*a* and the logic units 11*b* are shown in the figure and will not be described further in details.

Generally, a chip may include functions of clock generation and switching clock. The phase selection device 11 is usually used to switch clock, if a circuit on the chip needs to adjust phase of the clock.

FIG. 1C shows waveforms of the phase selection device 11. The phase selection circuits 11*a*0 and 11*a*1 in FIG. 1B are used as an example to describe an operating method of a conventional circuit. Please refer to FIG. 1B and FIG. 1C.

As shown in FIG. 1C, the general phase selection circuits 11*a*0 and 11*a*1 includes four states:

state 1: the switching signal S switches the phase clock signal P0 to P1 (that is, the phase selection circuit 11*a*1 is selected) where P0 is at a high level and P1 is at a low level (preparing for changing from a low level to a high level) at the time;

state 2: the switching signal S switches the phase clock signal P0 to P1 (that is, the phase selection circuit 11*a*1 is selected) where P0 is at a low level and P1 is at a high level (preparing for changing from a high level to a low level) at the time;

state 3: the switching signal S switches the phase clock signal P1 to P0 (that is, the phase selection circuit 11*a*0 is selected) where P1 is at a low level (preparing for changing from a low level to a high level) and P0 is at a high level at the time; and state 4: the switching signal S switches the phase clock signal P1 to P0 (that is, the phase selection circuit 11*a*0 is selected) where P1 is at a high level (preparing for changing from a high level to a low level) and P0 is at a low level at the time.

It should be noted that in FIG. 1C, the clock drawn by the thicker lines represents that the clock signal is effective, that is, the clock signal is a part signal of the output signal O and the clock drawn by the thinner lines represents that the clock signal is not effective, that is, the clock signal has no contribution to the output signal O.

Further the output signal O of the conventional phase selection device 11 is a continuous signal contributed by the effective clock signals in states 1-4. However, the output signal O of the phase selection device 11 discontinues between t0~t1 because the output signal O at t0 is at a low level and the output signal O at t1 is at a high level under the state 2. This phenomenon is called "glitch" and such a phenomenon causes the fault of a circuit using this clock.

BRIEF SUMMARY

One object of the invention is to provide a multi-phase clock switching device and method thereof, capable of eliminating the glitch phenomenon.

One object of the invention is to provide a multi-phase clock switching device and method thereof to enhance the signal quality.

One object of the invention is to provide a multi-phase clock switching device and method thereof to promote the signal accuracy.

An embodiment provides a multi-phase clock switching device. The multi-phase clock switching device includes a plurality of phase selection circuits to separately receive a plurality of phase clock signals and determine how to output the phase clock signals to generate an output signal according to at least a switching signal. Each phase selection circuit includes at least a selection unit and at least a protection unit. The selection unit receives at least a phase clock signal and determines how to output a phase clock signal according to the at least a phase clock signal and a selection signal. The protection unit determines how to generate the selection signal according to the at least a phase clock signal and the at least a switching signal. If the switching signal selects a phase selection circuit and a phase clock signal received by a selection unit of the phase selection circuit is at a first voltage level, the protection unit of the phase selection circuit disables or does not output a selection signal and the selection unit does not output the phase clock signal; If the phase clock signal is at a second voltage level, the protection unit of the phase selection circuit enables or outputs the selection signal and the selection unit of the phase selection circuit outputs the phase clock signal to generate the output signal.

Furthermore, an embodiment provides a data coding pattern stored in a multi-phase clock switching device, including: a first data coding pattern and a second data coding pattern. The first data coding pattern is stored in the multi-phase clock switching device and includes a plurality of gray code signals wherein each gray code signal includes an N-bit data code where N is larger than or equal to 3 and less than infinity. The second data coding pattern is stored in the multi-phase clock switching device and includes a plurality of sets of signal codes wherein each set of signal codes includes a plurality of sub-signal codes and the sub-signal codes form the second data coding pattern according to the first data coding pattern. Two sets of the two-bit data codes of each gray code signal of the first data coding pattern respectively determine that two sub-signal codes of the second data coding pattern are 1 and the rest of undetermined sub-signal codes are 0. The multi-phase clock switching device outputs phase clock signals corresponding to the two sub-signal codes if the two sub-signal codes are 1.

An embodiment of the invention provides a clock phase switching method, including the following steps: at first, receiving step, for receiving a plurality of phase clock signals; and switching step, for determining how to output the phase clock signals according to a switching signal. If the switching signal selects one of the phase clock signals and the received phase clock signal is at a first voltage level, the phase clock signal is not outputted; if the phase clock signal is at a second voltage level, the phase clock signal is outputted to generate an output signal.

The multi-phase clock switching device and method thereof according to embodiments utilize a signal protection mechanism to prevent the glitch phenomenon so as to achieve the purpose of enhancing the signal quality and accuracy.

BRIEF DESCRIPTION OF THE DRAWINGS

FIG. 3B shows a schematic diagram illustrating a data coding pattern according to one embodiment of the invention.

DETAILED DESCRIPTION OF THE INVENTION

Figure 2A:
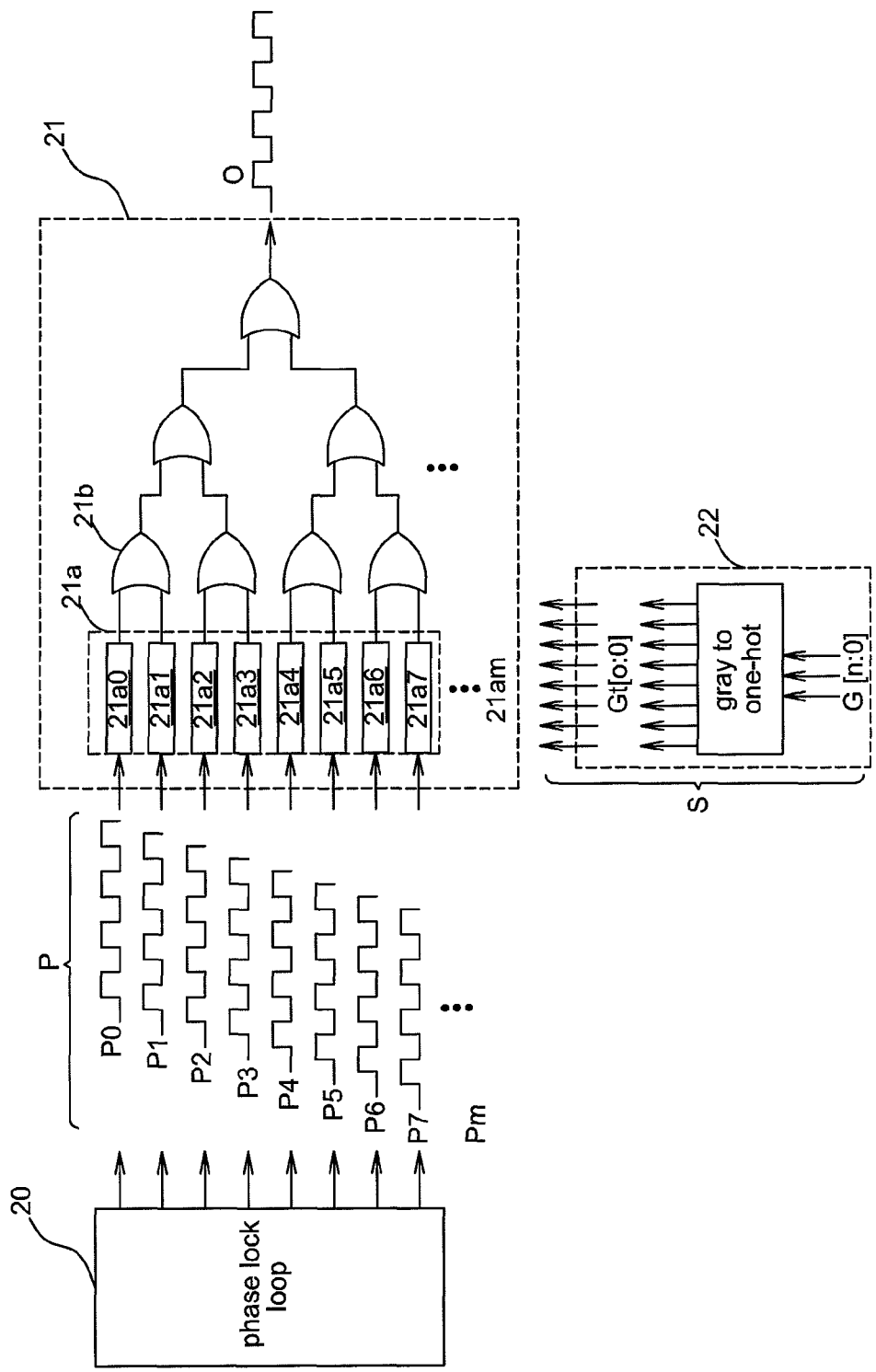
FIG. 2A shows a schematic diagram illustrating a multi-phase clock switching device and peripheral devices thereof according to one embodiment of the invention.

FIG. 2A shows a schematic diagram illustrating an embodiment of a multi-phase clock switching device 21 and peripheral devices thereof. In the figure, a phase lock loop 20, a multi-phase clock switching device 21, and a signal generator 22 are shown. The multi-phase clock switching device 21 receives a plurality of phase clock signals P (P0~Pm where m is a positive integer less than infinity) generated by the phase lock loop 20 and determines how to output the phase clock signals P to generate an output clock signal O according to a switching signal S generated by the signal generator 22.

In an embodiment, the signal generator 22 may be a code conversion unit, such as a gray to one-hot conversion unit in the figure that converts the gray code G[n:0] into a binary code Gt[o:0] to generate a switching signal S with a binary code. For example, G[2:0] may be converted into Gt[7:0]. In the above, "n" and "o" are integers less than infinity and then =o=$n^m$−1, where m is an integer less than infinity. For example, when the gray code G[2:0] has three bits, and then o=$2^3$−1=7. For instance, the switching signal S may be a gray code signal, having at least three bits. That is, the gray code signal has at least three data codes. In another embodiment, the switching signal S generated by the signal generator 22 may be a signal with a current or future coding format.

The multi-phase clock switching device 21 includes a plurality of phase selection circuits 21a (21a0~21am) for separately receiving a plurality of phase clock signals P (P0~Pm) and determining how to output the phase clock signals P (P0~Pm) to generate the output signal O according to the switching signal S. In an embodiment, the phase selection circuits 21a (21a0~21am) and a plurality of logic units 21b may perform signal switching according to the switching signal S.

In an example shown in FIG. 2A, eight phase selection circuits 21a0~21a7 are introduced to separately receive the phase clock signals P0~P7. The phase selection circuits 21a0~21a7 and seven logic units (OR gate) 21b may perform signal switching to generate the output signal O. In an embodiment, every two adjacent phase clock signals P may include a preset time difference and the phase clock signals P. In other applications, every two adjacent phase clock signals P may include a different time difference and the phase clock signals P does not need to be inputted to the phase selection circuits 21a0~21a7 sequentially or may be inputted to that according to a preset order.

The configuration of eight phase selection circuits 21a0~21a7 is used in the following to illustrate the technique of each embodiment but the invention is not limited to these examples. The technique of each embodiment is applicable to Q phase selection circuits 21a where Q is a positive integer less than infinity, for example, Q is larger than or equal to 8.

Figure 2B:
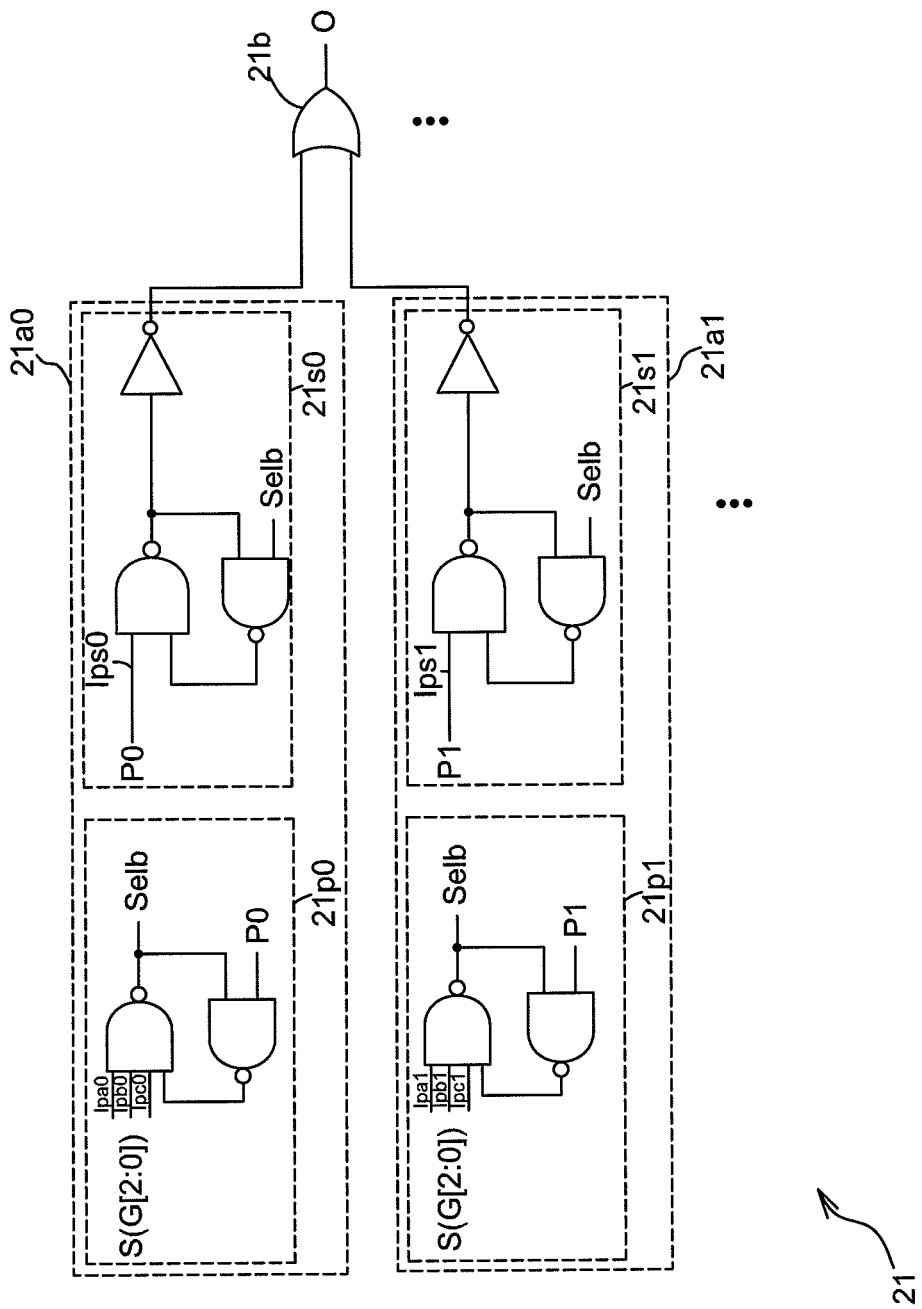
FIG. 2B shows a circuit block diagram of the phase selection circuits according to one embodiment of the invention.

FIG. 2B shows an embodiment of a block diagram of the phase selection circuits 21a. Each phase selection circuit 21a includes a selection unit 21s and a protection unit 21p. The selection unit 21s receives at least a phase clock signal P and determines how to output a phase clock signal P according to at least a phase clock signal and a selection signal Se1b. The protection unit 21p determines how to generate the selection signal Se1b according to the phase clock signal P and the switching signal S. Each selection unit 21s includes an input pin Ips and receives a phase clock signal P by the input pin Ips. The protection unit 21p includes three input pins Ipa, Ipb and Ipc, and to receive three data codes G[2], G[1], and G[0] of the gray code G[2:0] in the switching signal S by the three input pins Ipa, Ipb, and Ipc, respectively.

It should be noted, if the switching signal S selects a phase selection circuit in the phase selection circuits 21a (the following uses a case of selecting the phase selection circuit 21a1 as an example) and the phase clock signal P1 received by the selection unit 21s1 is at a first voltage level, such as high level 1, the protection unit 21p1 disables or does not output the selection signal Se1b to the selection unit 21s1 and the selection unit 21s1 does not output the phase clock signal P1. Further, only if the switching signal S selects the phase selection circuit 21a1 and the phase clock signal P1 is at a second voltage level, such as low level 0, the protection unit 21p1 enables or outputs the selection signal Se1b to the selection unit 21s1 and the selection unit 21s1 outputs the phase clock signal P1 to generate the output signal O according to the selection signal Se1b.

The following illustrates an embodiment of an operation method of the multi-phase clock switching device 21 by using the phase selection circuits 21a0 and 21a1 as an example.

Figure 2C:
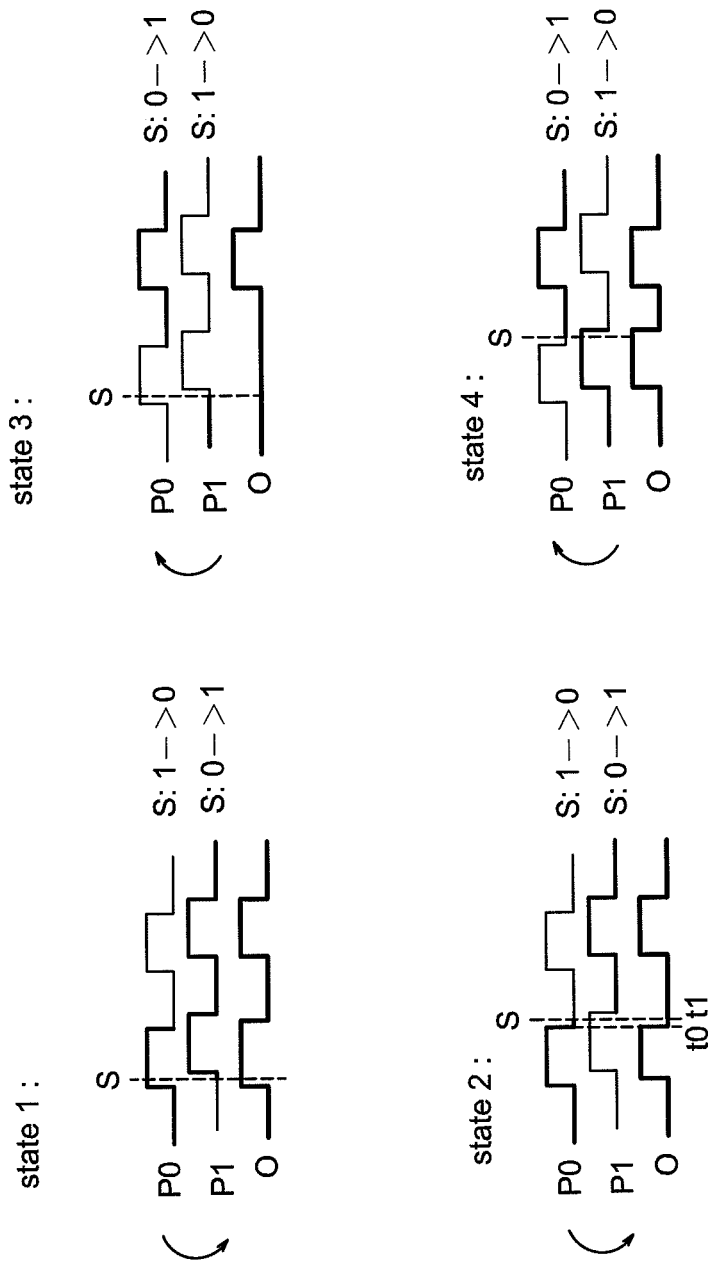
FIG. 2C shows waveforms of various switching states of the phase selection circuit according to one embodiment of the invention.

Please refer to FIGS. 2B and 2C where FIG. 2C shows waveforms of various switching states of the phase selection circuits 21a0 and 21a1. It should be note that in FIG. 2C and other waveform diagrams the clock drawn by the thicker lines represents that the clock signal is effective, that is, the clock signal contributes to the output signal O, and the clock drawn by the thinner lines represents that the clock signal is not effective, that is, the clock signal does not contribute to the output signal O.

Figure 1A:
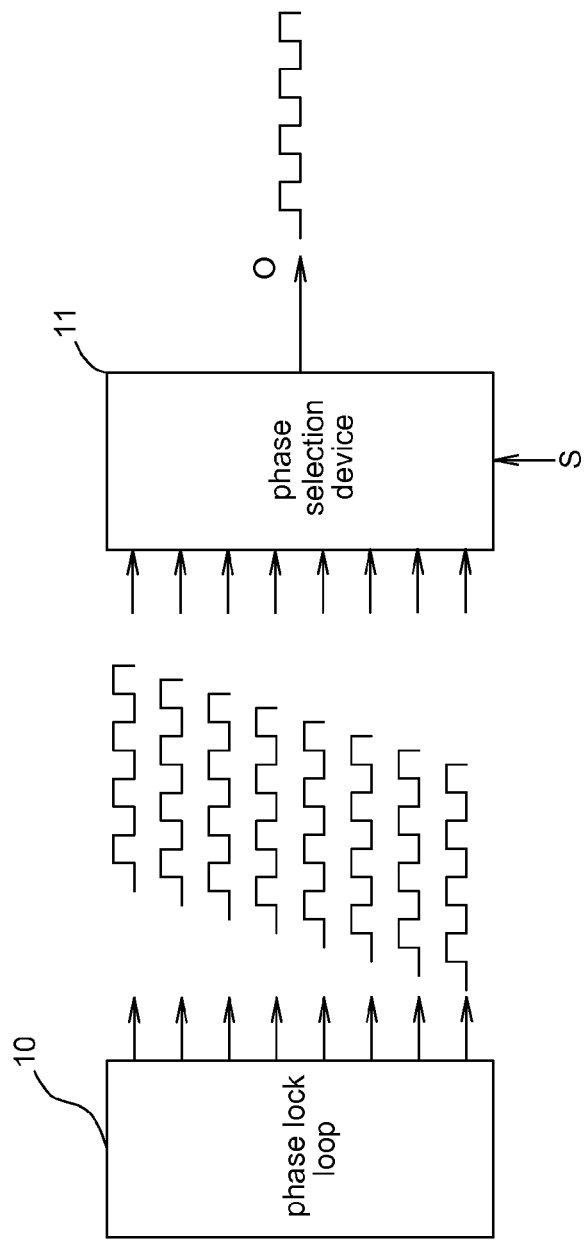
FIG. 1A shows a schematic diagram illustrating a phase selection circuit according to the prior art.
Figure 1B:
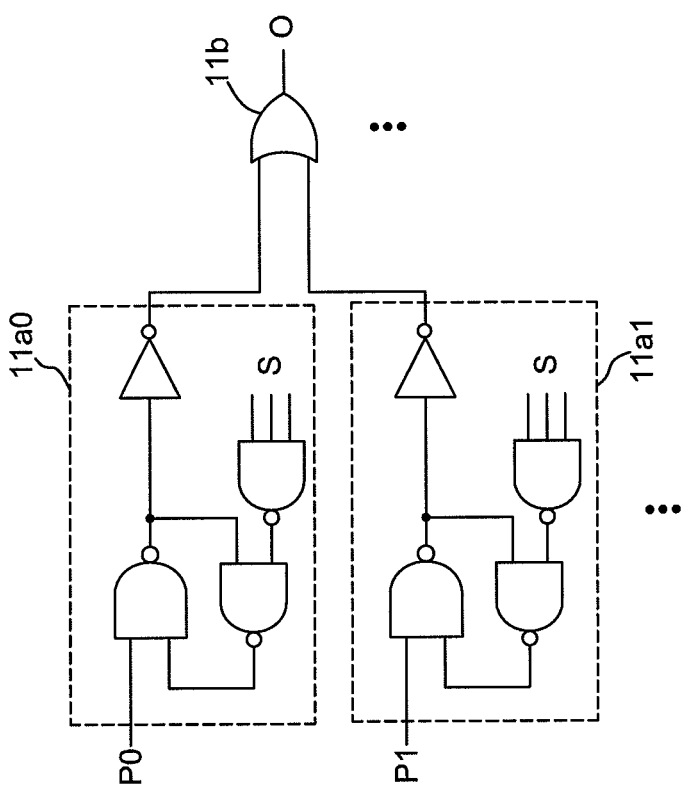
FIG. 1B shows a circuit block diagram of the phase selection circuit according to the prior art.
Figure 1C:
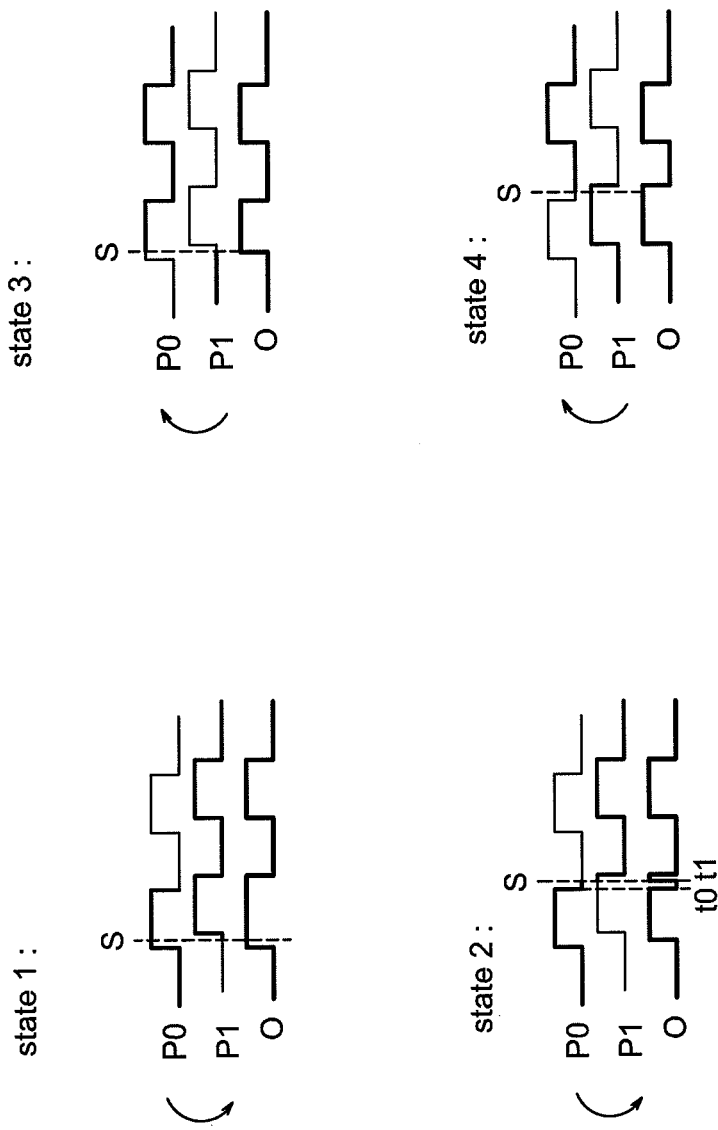
FIG. 1C shows operating waveforms of the phase selection circuit according to the prior art.

When the multi-phase clock switching device 21 switches the phase clock signals P0~P7 sequentially, the following four types of switching states are deduced (corresponding to the four states in the prior art shown in FIG. 1B):

the switching state 1: the switching signal S switches the phase clock signal P0 to P1 and at the time, P0 is at the high level 1, and the switching signal S corresponding to P0 changes voltage level from the high level 1 to the low level 0. In the meantime, P1 is at the low level 0 (preparing for changing from the low level 0 to the high level 1) and the switching signal S corresponding to P1 changes voltage level from the low level 0 to the high level 1.

the switching state 2: the switching signal S switches the phase clock signal P0 to P1 and at the time, P0 is at the low level 0 and the switching signal S corresponding to P0 changes voltage level from the high level 1 into the low level 0. In the meantime, P1 is at the high level 1 (preparing for changing from the high level 1 to the low level 0) and the switching signal S corresponding to P1 changes voltage level from the low level 0 to the high level 1.

the switching state 3: the switching signal S switches the phase clock signal P1 to P0 and at the time, P1 is at the low level 0 (preparing for changing from the low level 0 to the high level 1) and the switching signal S corresponding to P1 changes voltage level from the high level 1 to the low level 0. In the meantime, P0 is at the high level 1 and the switching signal S corresponding to P0 changes voltage level from the low level 0 to the high level 1.

the switching state 4: the switching signal S switches the phase clock signal P1 to P0 and at the time, P1 is at the high level 1 (preparing for changing from the high level 1 to the low level 0) and the switching signal S corresponding to P1 changes voltage level from the high level 1 to the low level 0. In the meantime, P0 is at the low level 0 and the switching signal S corresponding to P0 changes voltage level from the low level 0 into the high level 1.

It should be noted that the multi-phase clock switching device 21 always controls the output signal O being a continuous signal during the switching process under the switching states 1, 2, 3 and 4. Thus, the glitch phenomenon like the output signal O at the switching state 2 in the prior art will not occur. It is because each phase selection circuit 21a of the multi-phase clock switching device 21 includes a protection unit 21p to ensure the output signal O being continuous. The detailed principle is described in the following.

At the switching state 2, the multi-phase clock switching device 21 switches the phase clock signal from P0 to P1 at the time t1 according to the switching signal S, that is, the switching signal S selects the phase selection circuit 21a1. The protection unit 21p1 receives the switching signal S which is at the high level 1. It should be noted that the protection unit 21p1 includes a protection mechanism. If the phase clock signal P1 is at the high level 1, the protection unit 21p1 provides a protection mechanism to disable the selection signal Se1b to be 0 or does not output the selection signal Se1b to the selection unit 21s1. At the time, the selection unit 21s1 does not output the phase clock signal P1. That is, at the switching point t1 (time t1), the phase clock signal P1 at the high level 1 is not outputted because of the protection mechanism of the protection unit 21p1. If the switching signal S received by the protection unit 21p1 is still at the high level 1, that is, when the switching signal S still selects the phase selection circuit 21a1 and the phase clock signal P1 becomes the low level 0, the protection unit 21p1 outputs the selection signal Se1b or enables the selection signal Se1b to be the high level 1 to let the selection unit 21s1 output the phase clock signal P1 according to the selection signal Se1b. Therefore, the phase clock signal P1 will not be outputted until the phase clock signal P1 becomes the low level 0.

Further, the phase clock signal P0 before the switching point t1 of the switching signal S and the phase clock signal P1 after the switching point t1 of the switching signal S are sent to an OR gate. Then the OR gate generates the output signal O according to the phase clock signal P0 and P1. After the switching point t1, the phase selection signal 21a1 does not output a signal with the high level 1. Thus, as shown in the figure, the output signal O is still a signal with the low level after the switching point t1 until the phase clock signal P1 is at the high level in next period of phase clock signal P1. Therefore, the glitch phenomenon like the output signal O at the switching state 2 in the prior art shown in FIG. 1B does not occur. The output signal O can be a continuous signal in the embodiment of the invention.

It should be noted that the operating method of the other three switching states 1, 3 add 4 can be understood by one of ordinary skill in the art from the above description. The switching result of every switching state can be obtained as the continuous waveforms shown in the figure. Thus, their details will not be given hereinafter.

As a result, while switching the phase clock signal, the multi-phase clock switching device 21 ensures next switching phase clock signal being the low level 0 but not the high level 1 to generate the continuous output signal O without generating signal interference. Thus, the problem in the prior art can be solved and the signal quality can be enhanced.

Figure 3A:
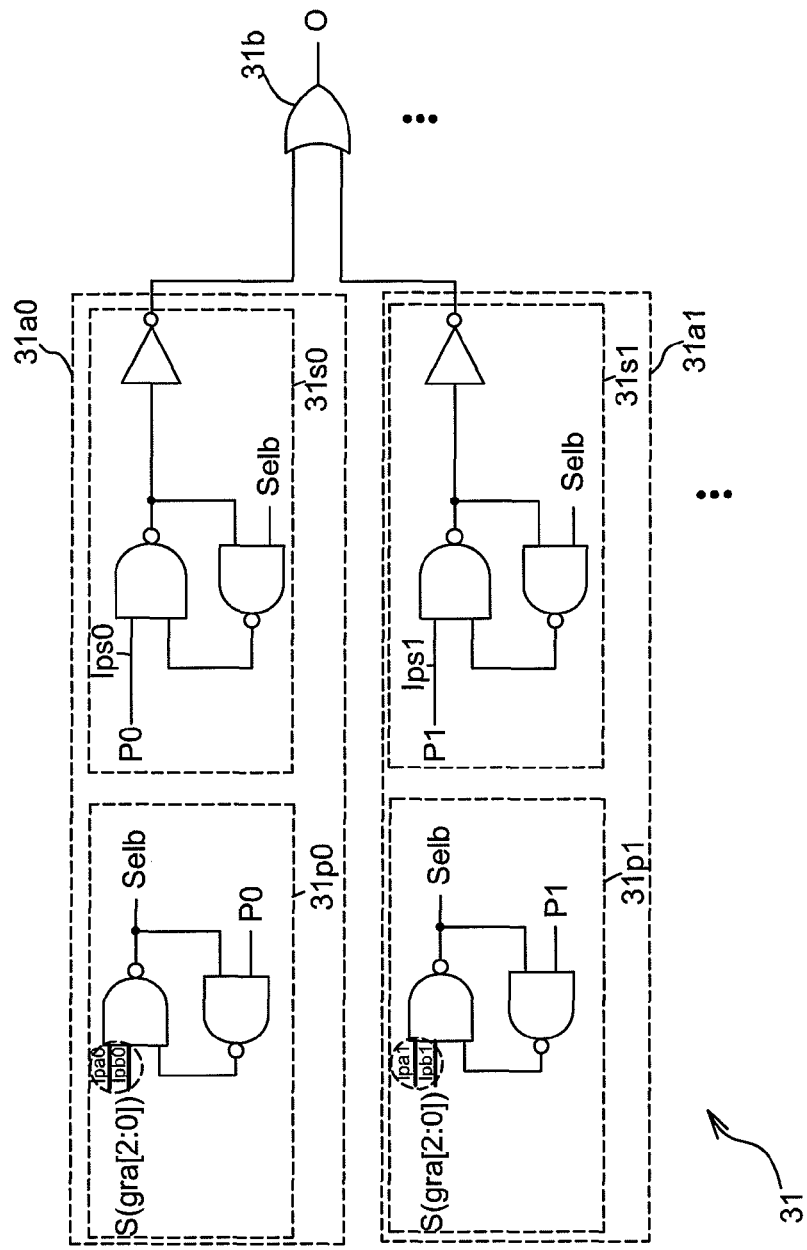
FIG. 3A shows a schematic diagram illustrating a multi-phase clock switching device 31 according to another embodiment of the invention.

FIG. 3A shows a schematic diagram illustrating a multi-phase clock switching device 31 according to another embodiment. The multi-phase clock switching device 31 includes a plurality of phase selection circuits 31a0~31a7 and a plurality of OR gates 31b. Each phase selection circuit separately receives the phase clock signals P0~P7 and determines which phase clock signal is to be outputted according to the switching signal S. Then, the selected phase clock signal P is outputted by the OR gate 31b to generate the output signal O.

As shown in FIG. 3A, each phase selection circuit 31a0~31a7 includes a selection unit 31s and a protection unit 31p. For example, the protection unit 31p1 of the phase selection circuit 31a1 receives the switching signal S and determines the voltage level of a selection signal Se1b according to the state of the received phase clock signal P1. The selection unit 31s receives the phase clock signal P1 and determines how to output the phase clock signal P1 as the output signal O according to the selection signal Se1b. Each selection unit 31s includes an input pin Ips and uses the input pin Ips to receive a phase clock signal P. Each protection unit 31p includes two input pins Ipa and Ipb and uses the input pins Ipa and Ipb to separately receive two data codes of the three data codes G[2], G[1] and G[0]. The function of the protection unit 31p ensures the output signal O being continuous.

It should be noted that in this embodiment the protection unit 31p uses the two input pins Ipa and Ipb to receive switching signal S with the gray code, and uses the gray code G[2:0] to achieve the mechanism of controlling the phase selection circuits 31a0~31a7, as shown in FIG. 3B. In another embodiment, the invention can use a switching signal with other codes having current or future coding formats.

In an embodiment, the three data codes of the gray code may set as follows:

the first gray code (1): G[2]=0, G[1]=0, G[0]=0;
the second gray code (2): G[2]=0, G[1]=0, G[0]=1;
the third gray code (3): G[2]=0, G[1]=1, G[0]=1;
the fourth gray code (4): G[2]=0, G[1]=1, G[0]=0;
the fifth gray code (5): G[2]=1, G[1]=1, G[0]=0;
the sixth gray code (6): G[2]=1, G[1]=1, G[0]=1;
the seventh gray code (7): G[2]=1, G[1]=0, G[0]=1; and
the eighth gray code (8): G[2]=1, G[1]=0, G[0]=0.

The operating method of FIG. 3B is set as follows:

1. Please refer to the frame line a0. The phase selection circuit 31a0 is set to receive two data codes G[2] and G[1] and, if G[2]=0 and G[1]=0, the phase selection circuit 31a0 is selected and the phase clock signal P0 is outputted. If the first gray code (1) and the second gray code (2) are outputted, the phase selection circuit 31a0 is in operation.

2. Please refer to the frame line a1. The phase selection circuit 31a1 is set to receive two data codes G[2] and G[0] and, if G[2]=0 and G[0]=1, the phase selection circuit 31a1 is selected and the phase clock signal P1 is outputted. If the second gray code (2) and the third gray code (3) are outputted, the phase selection circuit 31a1 is in operation 3. Please refer to the frame line a2. The phase selection circuit 31a2 is set to receive two data codes G[2] and G[1] and, if G[2]=0 and G[1]=1, the phase selection circuit 31a2 is selected and the phase clock signal P2 is outputted. If the third gray code (3) and the fourth gray code (4) are outputted, the phase selection circuit 31a2 is in operation.

4. Please refer to the frame line a3. The phase selection circuit 31a3 is set to receive two data codes G[1] and G[0] and, if G[1]=1 and G[0]=0, the phase selection circuit 31a3 is selected and the phase clock signal P3 is outputted. If the fourth gray code (4) and the fifth gray code (5) are outputted, the phase selection circuit 31a3 is in operation.

5. Please refer to the frame line a4. The phase selection circuit 31a4 is set to receive two data codes G[2] and G[1] and, if G[2]=1 and G[1]=1, the phase selection circuit 31a4 is selected and the phase clock signal P4 is outputted. If the fifth gray code (5) and the sixth gray code (6) are outputted, the phase selection circuit 31a4 is in operation.

6. Please refer to the frame line a5. The phase selection circuit 31a5 is set to receive two data codes G[2] and G[0] and, if G[2]=1 and G[0]=1, the phase selection circuit 31a5 is selected and the phase clock signal P5 is outputted. If the sixth gray code (6) and the seventh gray code (7) are outputted, the phase selection circuit 31a5 is in operation.

7. Please refer to the frame line a6. The phase selection circuit 31a6 is set to receive two data codes G[2] and G[1] and, if G[2]=1 and G[1]=0, the phase selection circuit 31a6 is selected and the phase clock signal P6 is outputted. If the seventh gray code (7) and the eighth gray code (8) are outputted, the phase selection circuit 31a6 is in operation.

8. Please refer to the frame line a7. The phase selection circuit 31a7 is set to receive two data codes G[1] and G[0] and, when G[1]=0 and G[0]=0, the phase selection circuit 31a7 is selected and the phase clock signal P7 is outputted. If the eighth gray code (8) and the first gray code (1) are outputted, the phase selection circuit 31a7 is in operation.

The mechanism of FIG. 3B is described in details in the following accompanying with FIGS. 3A and 3C.

For example, if the switching signal S is the first gray code (1): G[2]=0, G[1]=0, and G[0]=0, the two input pins of the protection unit 31p0 of the phase selection circuit 31a0 receive G[2]=0, G[1]=0 and the phase selection circuit 31a0 is selected according the preset setting. When the phase clock signal P0 received by the phase selection circuit 31a0 is at the high level 1, the selection signal Se1b of the protection unit 31P0 is disabled (the low level 0) and thus the phase clock signal P0 is not outputted. The protection unit 31P0 does not enable the selection signal Se1b to output the phase clock signal P0 until the phase clock signal P0 becomes the low level 0. In the meantime, the two input pins of the protection unit 31p7 of the phase selection circuit 31a7 receive G[1]=0, G[0]=0 and the phase selection circuit 31a7 is selected according to the preset setting to execute the same process and protecting operation as the phase selection circuit 31a0 and then output the phase clock signal P7.

An exemplary embodiment is assumed that the multi-phase clock switching device 31 is operating at the switching state 2 and at the time t1 the phase clock signal P0 is switched to P1. At the time, the switching signal S changes from the first gray code (1): G[2]=0, G[1]=0, G[0]=0 to the second gray code (2): G[2]=0, G[1]=0, G[0]=1. Viewing from the switching transition, it is seen that the output signal O is composed of three waveforms, including (1) the first waveform: the phase clock signal P0 at the time when the switching signal S of the phase selection circuit 31a0 changes from the high level 1 to the low level 0; (2) the second waveform: the phase clock signal P0 at the time when the switching signal S of the phase selection circuit 31a0 keeps at the high level 1; and (3) the third waveform: the phase clock signal P1 at the time when the switching signal S of the phase selection circuit 31a1 changes from the low level 0 to the high level 1, like the waveform of the switching state 2 shown on the bottom left side of FIG. 3C.

The first waveform is the phase clock signal P0 generated by the phase selection circuit 31a0 after the two input pins Ipa0, Ipb0 of the protection unit 31p0 of the phase selection circuit 31a0 receive the previous data codes G[2]=0, G[1]=0. After the data codes become G[2]=0, G[1]=0, and G[0]=1, the two input pins Ipa0, Ipb0 of the protection unit 31p0 of the phase selection circuit 31a0 are still selected according to the data codes G[2]=0, G[1]=0 and, after processing and the protecting operation by the phase selection circuit 31a0, the phase clock signal P0 is delayed and outputted so as to generate the second waveform. Besides, the two input pins Ipa1, Ipb1 of the protection unit 31p1 of the phase selection circuit 31a1 receive G[1]=0, G[0]=1 and, after processing and protecting operation, the phase selection circuit 31a1 is selected to output the phase clock signal P1 to thereby generate the third waveform.

The operation of the switching signal to switch the two adjacent first and second phase selection circuits 31a0, 31a1 executed by the multi-phase clock switching device 31 can be divided into the time before the switching point t1 and the time after the switching point t1. The first phase selection circuit 31a0 outputs a first phase clock signal P0 before the switching point t1 and also outputs the first phase clock signal P0 after the switching point t1. The second phase selection circuit 31a1 outputs a second phase clock signal P1 after the switching point t1. The multi-phase clock switching device 31 combines the three phase clock signals, that is, it combines the three waveforms. The glitch phenomenon of the output signal O does not occur because of the protection mechanism and the additional second waveform.

Figure 3C:
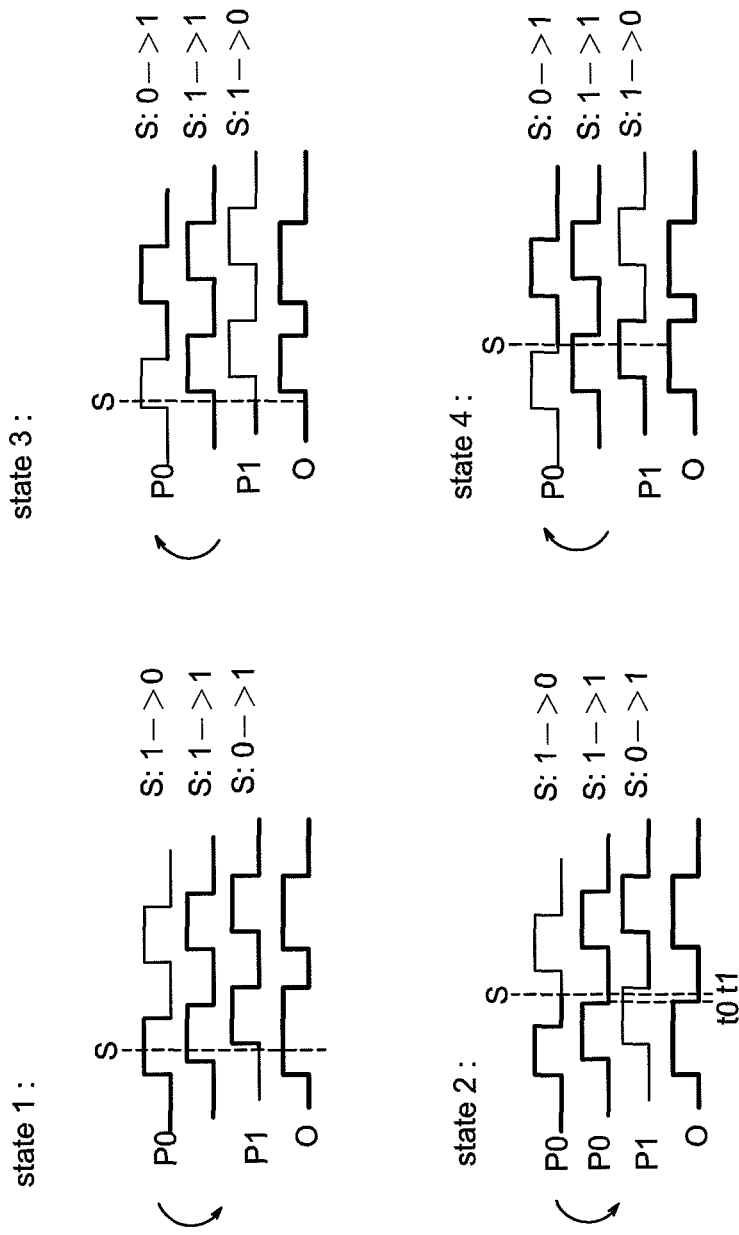
FIG. 3C shows waveforms of various switching states of the phase selection circuit according to one embodiment of the invention.

Till now, the other switching states 1, 3, and 4 in FIG. 3C can be implemented accordingly from the above description by one of ordinary skill in the art. Similarly, switching between other phase clock signals can also be performed accordingly by one of ordinary skill in the art. Therefore, their details will not be given hereinafter.

From the above description, it is found that the multi-phase clock switching device 31 can output the combination of the first, second, and third waveforms to generate the output signal O with a complete waveform when the switching signal changes from one gray code to another. Thus, the glitch problem in the prior is solved and the signal quality is enhanced. It should be noted that the waveform of the output signal O of the switching state 3 according to this embodiment is more complete than that of the output signal O of the switching state 3 shown in FIG. 2C. That is, the switching state 3 according to this embodiment has no state of being at the low level within one period for the output signal O.

Figure 4A:
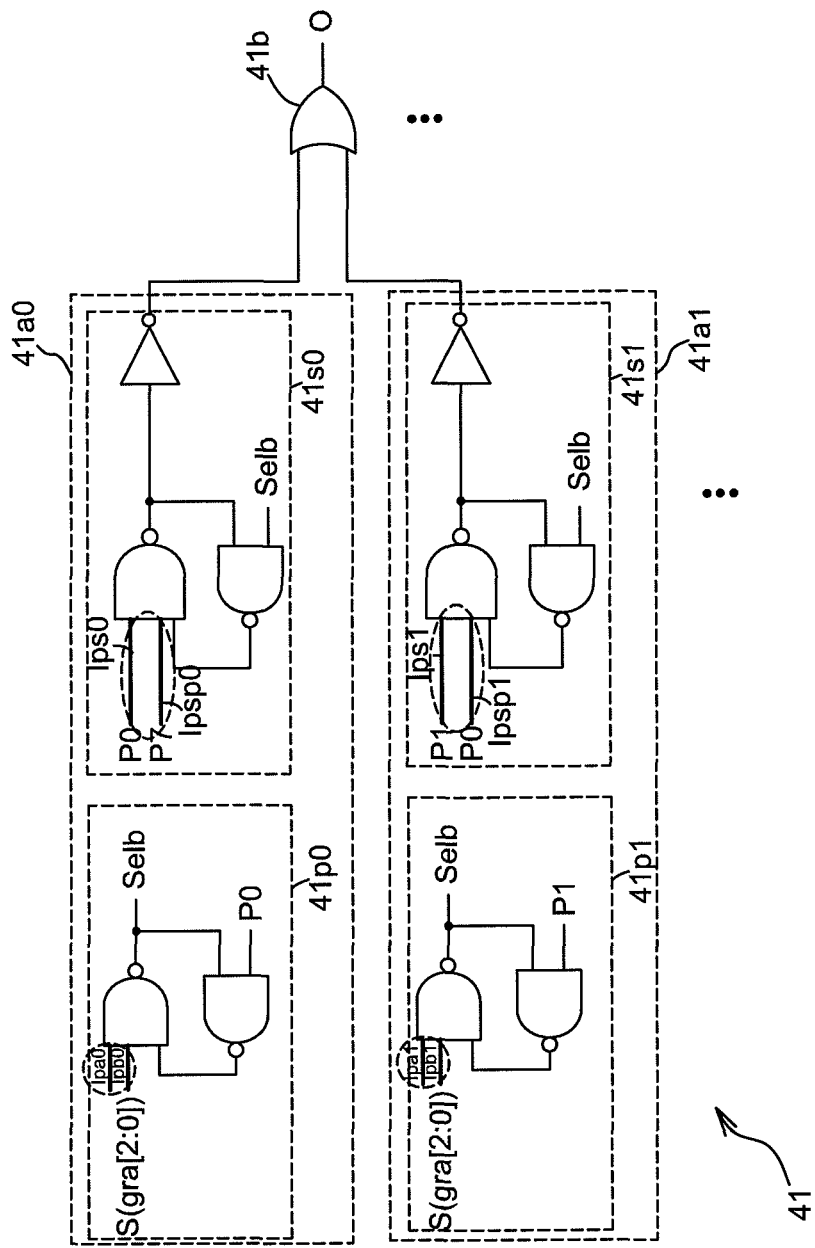
FIG. 4A shows a schematic diagram illustrating a multi-phase clock switching device according to another embodiment of the invention.

FIG. 4A shows a schematic diagram illustrating a multi-phase clock switching device 41 according to another embodiment. The multi-phase clock switching device 41 includes a plurality of phase selection circuits 41a and a plurality of logic OR gates 41b. Each selection unit 41s includes two input pins Ips and Ipsp and uses the input pin Ips to receive a current phase clock signal P[m] and Ipsp to receive the previous one phase clock signal P[m−1].

An exemplary embodiment, the protection unit 41p like the protection unit 31p of FIG. 3A uses the two input pins Ipa and Ipb to receive the switching signal S with the gray code. The protection unit 41p uses the gray code G[2:0] to control the phase selection circuits 41a0~41a7. Please note that the control mechanism of multi-phase clock switching device 41 is the same as that of the signal pattern shown in FIG. 3B. In another embodiment, the invention can use a switching signal with other codes having various current or future coding formats.

Figure 4B:
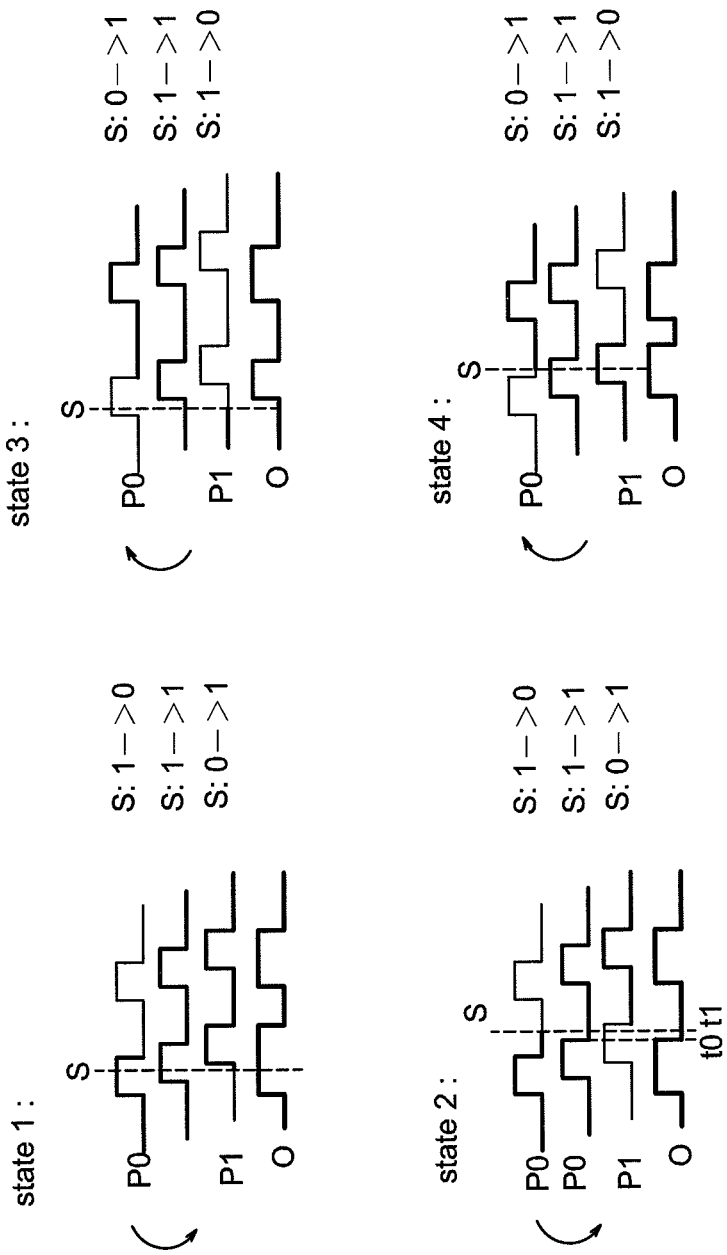
FIG. 4B shows waveforms of various switching states of the phase selection circuit according to one embodiment of the invention.
Figure 4C:
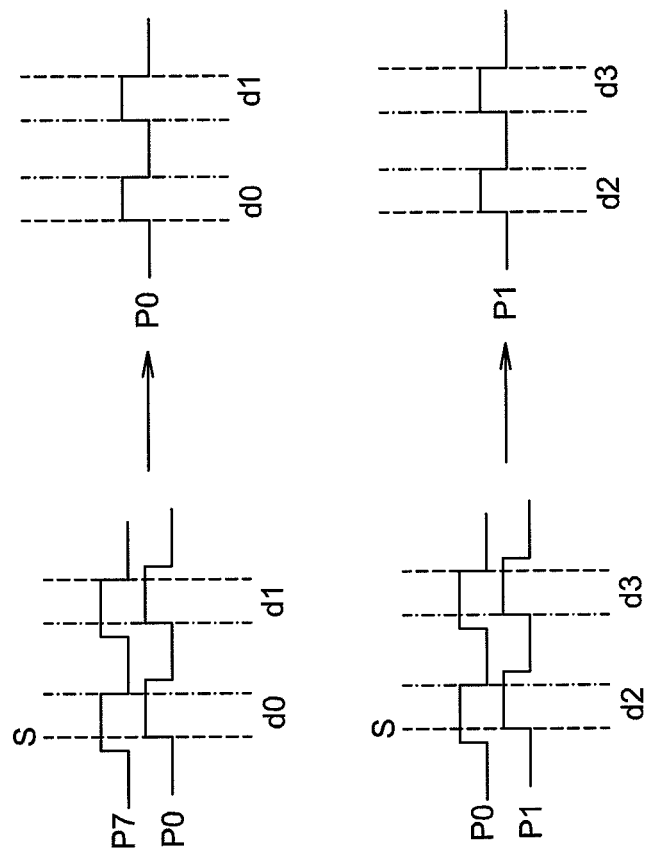
FIG. 4C shows a waveform diagram illustrating that the selection unit shown in FIG. 4A uses two clock signals together with the circuit determination to determine the output signal.

The difference between the multi-phase clock switching device 41 and the multi-phase clock switching device 31 is that the selection unit 41s of the multi-phase clock switching device 41 receives the previous one phase clock signal P[m−1] and the current phase clock signal P[m]. Further, the multi-phase clock switching device 41 determines how to output the phase clock signal P[m] according to the phase clock signals P[m] and P[m−1]. For example, referring to FIGS. 4A, 4B, and 4C and viewing the phase clock signals P7, P0 and P0, P1, the output of the clock signal of the selection unit 41s1 of the phase selection circuit 41a1 should fulfill the following criteria: the clock signals P0, P1 are at the high level 1, the switching signal S is at the high level 1, and Se1b is at the low level 0 so that selection unit 41s1 may output the clock signal P1. Therefore, as shown in FIG. 4C, the waveform of the clock signal P1 satisfies the above criteria only during the periods d2 and d3. Thus, the output of the clock signal P1 is shown on the bottom right side of the figure being at the high level in the periods d2 and d3 to thereby reduce the pulse width of the clock signal. The output of the clock signal P0 also cooperates with the criteria of P7 and the switching signal S being at the high level 1 and Se1b being at the low level 0 to result in the waveform P0 shown on the right-hand side of the figure where this waveform is also reduced.

By this method, as shown in FIG. 4C, the pulse width of each phase clock signal P is reduced and the pulse width of the whole output signal O is smaller than that of the output signal O shown in FIG. 3C. Therefore, the pulse width of the final outputted output signal O is more uniform than that of the output signal O shown in FIG. 3C and the signal is more recognizable.

Figure 5:
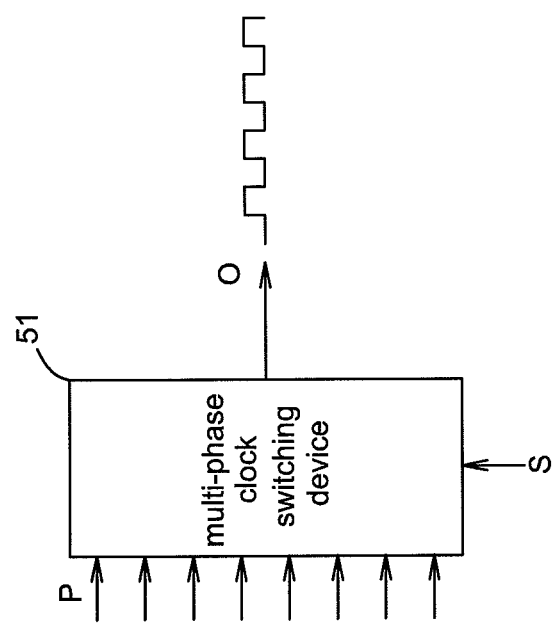
FIG. 5 shows a schematic diagram illustrating data coding pattern stored in a multi-phase clock switching device according to one embodiment of the invention.

FIG. 5 shows a schematic diagram illustrating data coding pattern stored in a multi-phase clock switching device 51 according to an embodiment. The multi-phase clock switching device 51 stores the data coding pattern shown in FIG. 3B where the data coding pattern includes a first coding pattern Par1 and a second coding pattern Par2.

The first coding pattern Par1 is stored in the multi-phase clock switching device 51 and includes a plurality of gray code signals, for example, the first-eighth gray code signals (1)-(8). Each gray code signal includes N bits of data code where N is larger than or equal to 3 and less than infinity. For example, N is equal to 3 in the figure, G[2], G[1], and G[0].

The second coding pattern Par2 is stored in the multi-phase clock switching device 51 and includes a plurality of sets of signal codes, for example, (a)~(h) in the figure. Each set of signal codes includes a plurality of sub-signal codes, for example, ((a), P0)-((a), P7) of the (a) set. The sub-signal codes form the second data coding pattern Par2 according to the first data coding pattern Par1.

Two sets of the two-bit data codes of each gray code signal of the first data coding pattern Par1 determine that two sub-signal codes of the second data coding pattern Par2 are 1, respectively, and the rest of undetermined sub-signal codes are 0. For example, the two sets of the two-bit data codes G[2]=0, G[1]=0 an G[1]=0, G[0]=0 of the first gray code signal (1) of the first data coding pattern Par1 determine that the two sub-signal codes ((a), P0) and ((a), P7) of the second data coding pattern Par2 are 1 and the rest of undetermined sub-signal codes ((a), P1)~((a), P6) are 0. If the two sub-signal codes are 1, for example, ((a), P0) and ((a), P7) are 1, the multi-phase clock switching device 51 outputs the phase clock signals corresponding to the two sub-signal codes such as the phase clock signals P0 and P7.

It should be noted that the two sub-signal codes being 1 in the second data coding pattern Par2 correspond to the two continuous phase clock signals. For example, the two sub-signal codes 1, 1 correspond to the phase clock signals P0 and P1.

Figure 6:
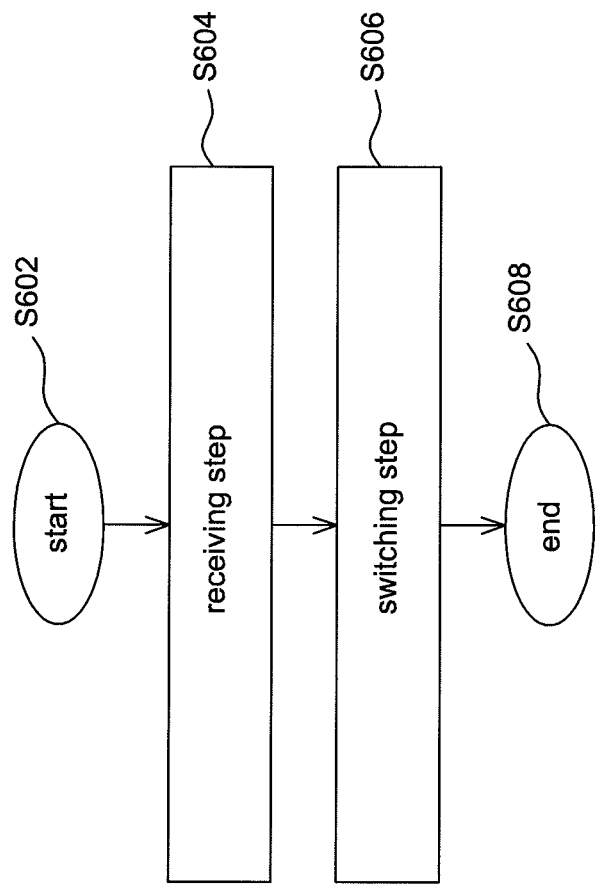
FIG. 6 shows a flow chart illustrating a multi-phase clock switching method according to one embodiment of the invention.

FIG. 6 shows a flow chart illustrating a multi-phase clock switching method according to one embodiment of the invention. The method comprises the following steps:

Step S602: start;

Step S604: receiving step, for receiving a plurality of phase clock signals;

Step S606: switching step, for determining how to output the phase clock signals according to a switching signal; wherein, if the switching signal selects one of the phase clock signals and the received phase clock signal is at a first voltage level, the phase clock signal is not outputted; if the phase clock signal is at a second voltage level, the phase clock signal is outputted to generate an output signal; and Step S608: end.

It should be noted that the above first voltage level may be a high level and the second voltage level may be a low level.

Furthermore, in an embodiment, the switching step S606 includes the following steps: at first, switching between two adjacent first and second phase clock signals according to the switching signal; defining switching time of the switching signal as the time before the switching point and the time after the switching time point; and then before the switching point, outputting a first phase clock signal; after the switching point, outputting the first phase clock signal and a second phase clock signal, and combining the three phase clock signals to generate the output signal.

The multi-phase clock switching device and method according to the embodiments utilize a signal protection mechanism to prevent the glitch phenomenon so as to achieve the purpose of enhancing the signal quality and accuracy.

Although the present invention has been fully described by the above embodiments, the embodiments should not constitute the limitation of the scope of the invention. Various modifications or changes can be made by those who are skilled in the art without deviating from the spirit of the invention.

What is claimed is:

1. A multi-phase clock switching device, comprising:
at least a phase selection circuit, comprising:
a first phase selection circuit, for receiving a current phase clock signal and a previous one phase clock signal, and determining how to output the current phase clock signal to be an output signal according to a switching signal wherein the first phase selection circuit comprises:
a selection unit, for receiving the current phase clock signal and determining how to output the current phase clock signal according to the current phase clock signal and a selection signal; and
a protection unit, generating the selection signal according to a voltage level of the current phase clock signal and the switching signal;
wherein, if the current phase clock signal is at a first voltage level and the previous one phase clock signal is at a second voltage level, the protection unit disables or does not output the selection signal and the selection unit does not output the current phase clock signal; if the current phase clock signal and the previous one phase clock signal are both equal to the second voltage level, the protection unit enables or outputs the selection signal and the selection unit outputs the current phase clock signal to generate the output signal.

2. The device according to claim 1, wherein the first voltage level and the second voltage level are at different voltage levels.

3. The device according to claim 1, wherein the selection unit comprises an input pin to receive the current phase clock signal.

4. The device according to claim 1, further comprising:
a second phase selection circuit having the same structure as the first phase selection circuit according to claim 1 wherein the second phase selection circuit receives the previous one phase clock signal and the selection unit comprises two input pins, one of which is used to receive the current phase clock signal and another one of which is used to receive the previous one phase clock signal.

5. The device according to claim 3, wherein the switching signal is a gray code signal and the gray code signal has at least three bits, that is, the gray code signal comprises at least three data codes.

6. The device according to claim 5, wherein the protection unit comprises three input pins to separately receive the at least three data codes.

7. The device according to claim 5, wherein the protection unit comprises two input pins to separately receive two of the three data codes.

8. The device according to claim 1, when the at least a phase selection circuit includes a plurality of phase selection circuits, another one of a phase selection circuits having the same structure as the first phase selection circuit, wherein a switching point of the switching signal is when the first phase selection circuit is switched to the second phase selection circuit; the first phase selection circuit outputs the current phase clock signal and the second phase selection circuit outputs the previous one phase clock signal after the switching point; and the multi-phase clock switching device combines the two phase clock signals to generate the output signal.

9. The device according to claim 1, wherein when the at least a phase selection circuit includes a plurality of phase selection circuits, the number of the plurality of phase selection circuits is larger than or equal to 8.

10. The device according to claim 1, wherein when the at least a phase selection circuit includes a plurality of phase selection circuits, at least another phase selection circuit, having the same structure as the first phase selection circuit and separately receiving a phase clock signal wherein each phase clock signal has a preset time difference, one of the phase clock signals also has the preset time difference with the current phase clock signal, and the phase clock signals are separately inputted to the phase selection circuits.

11. The device according to claim 10, wherein when the at least a phase selection circuit includes a plurality of phase selection circuits, the at least one phase selection circuit generates the output signal according to the switching signal.

12. The device according to claim 4, wherein the selection unit outputs the current phase clock signal when the current phase clock signal and the previous one phase clock signal are at the high level, the switching signal is at the high level, and the selection signal is at the low level.

13. A clock phase switching method, comprising:
receiving step, for receiving a plurality of phase clock signals; and
switching step, for determining how to output the phase clock signals to be output signals according to a switching signal;
generating a selection signal according to a voltage level of one of the phase clock signals and the switching signal;
wherein, when the switching signal selects one of the phase clock signals to be at a first voltage level and a previous one phase clock signal before the one of the clock signals to be at a second voltage level, the selection signal is not outputted to select the one of the phase clock signals to be outputted; when the one of the phase clock signals and the previous one phase clock signal are both equal to the second voltage level, the selection signal is outputted to select the one of the phase clock signals to be outputted to generate an output signal.

14. The method according to claim 13, wherein the first voltage level and the second voltage level are at different voltage levels.

15. The method according to claim 13, wherein the switching step comprises:
according to the switching signal, executing switching between two adjacent first and second phase clock signals;
defining switching time of the switching signal as a time before a switching time point and a time after the switching time point; and
before the switching time point, outputting a first phase clock signal; after the switching time point, outputting the first phase clock signal and a second phase clock signal and combining the three phase clock signals to generate the output signal.

16. A phase selection circuit, comprising:
a selection unit, comprising a clock input pin and a signal input pin wherein the clock input pin of the selection unit is used to receive a phase clock signal, the signal input pin of the selection unit is used to receive a selection signal, and an output signal is generated according to a current phase clock signal and the selection signal;
a protection unit, comprising a clock input pin and at least two signal input pins wherein the clock input pin of the protection unit is used to receive the phase clock signal, one of the signal input pins of the protection unit is used to receive a first coding data of a switching signal, another one of the signal input pins of the protection unit is used to receive a second coding data of the switching signal, and the selection signal is generated according to the current phase clock signal and the coding data of the switching signal;

wherein, when the current phase clock signal is at a first voltage level and a previous one phase clock signal is at a second voltage level, the protection unit disables or does not output the selection signal and the selection unit does not output the current phase clock signal; when current phase clock signal and the previous one phase clock signal are both the same the second voltage level, the protection unit enables or outputs the selection signal and the selection unit outputs the current phase clock signal to generate the output signal.

17. A phase selection circuit, comprising:
a selection unit, comprising two clock input pins and a signal input pin wherein one of the clock input pins of the selection unit is used to receive a current phase clock signal, another one of the clock input pin is used to receive the previous one phase clock signal of the phase clock signal, the signal input pin of the selection unit is used to receive a selection signal, and an output signal is generated according to the phase clock signals and the selection signal; and
a protection unit, comprising a clock input pin and at least two signal input pins wherein a current clock input pin of the protection unit is used to receive the phase clock signal, one of the signal input pins of the protection unit is used to receive a first coding data of a switching signal, another one of the signal input pins of the protection unit is used to receive a second coding data of the switching signal, and the selection signal is generated according to the current phase clock signal and the coding data of the switching signal;

wherein, when the current phase clock signal is at a first voltage level and the previous one phase clock signal is at a second voltage level, the protection unit disables or does not output the selection signal and the selection unit does not output the current phase clock signal; when the current phase clock signal and the previous one phase clock signal are both the same to equal to the second voltage level, the protection unit enables or outputs the selection signal and the selection unit outputs the current phase clock signal to generate the output signal.

18. The circuit according to claim 17, wherein the selection unit output the current phase clock signal when the previous one phase clock signal and the current phase clock signal are at a high level, the switching signal is at a high level, and the selection signal at a low level.

* * * * *